June 25, 1963  A. G. SMITH  3,095,148
LAWN SPRINKLER
Filed Oct. 30, 1961  2 Sheets-Sheet 1

INVENTOR.
ARCHIE G. SMITH
BY
*Fishburn and Gold*
ATTORNEYS

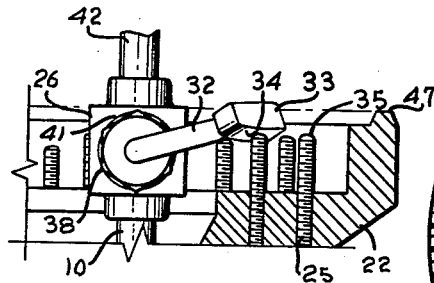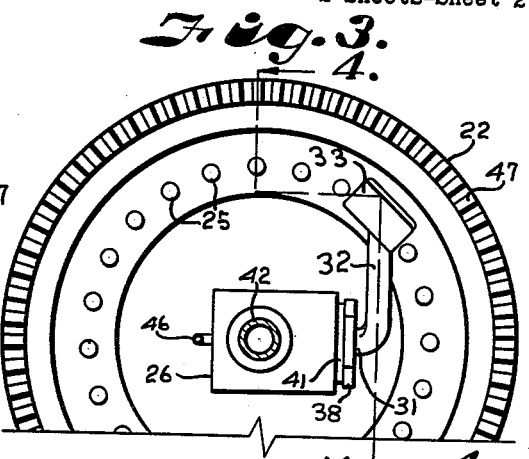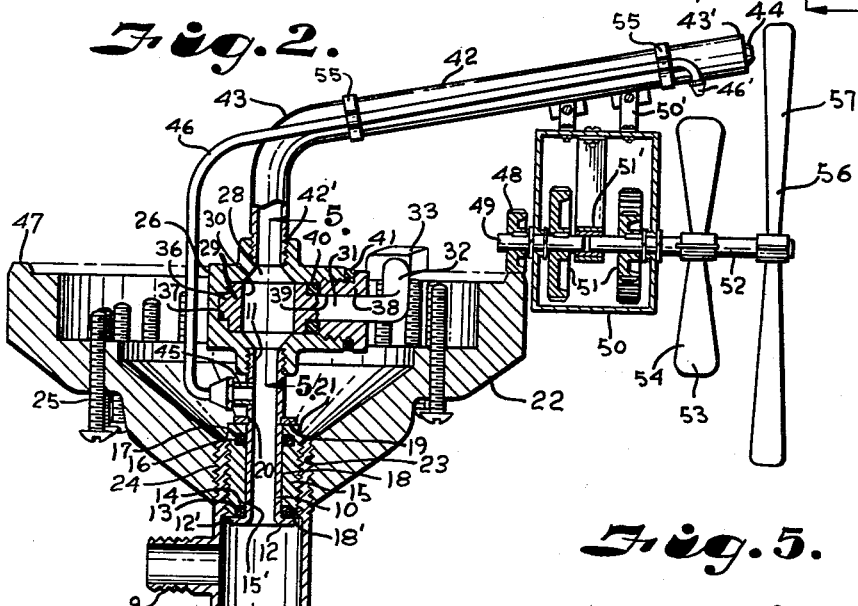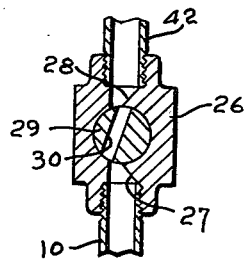

United States Patent Office 3,095,148
Patented June 25, 1963

3,095,148
LAWN SPRINKLER
Archie G. Smith, 709 Palisades Drive NW.,
Albuquerque, N. Mex.
Filed Oct. 30, 1961, Ser. No. 149,819
1 Claim. (Cl. 239—97)

This invention relates to lawn or garden sprinklers, and more particularly to an improved sprinkler of the rotary type which is adjustable to distribute water over a non-circular area.

The principal objects of the present invention are: to provide a rotary lawn sprinkler which is easily adjustable to automatically distribute water over a repeatable, consistently variable distance from the spray nozzle upon each revolution thereof; to provide such a device that will distribute water spray over a selected area having different radial dimensions from the nozzle; to provide such a device wherein the speed of nozzle rotation is substantially independent of the distance over which the nozzle is spraying; to provide such apparatus which includes a plurality of adjusting members, the adjusted position of which determines the velocity of water spray at the particular rotary position of the spray nozzle associated therewith; to provide such a lawn sprinkler which may be received in a socket permanently embedded in a lawn or garden whereby a predetermined spray pattern may be repeated at will; and to provide such a device which is simple in construction, exhibits a long, useful life, and is rugged and reliable in use.

Other objects and advantages of this invention will become apparent from the following description taken in connection with the accompanying drawings wherein are set forth by way of illustration and example certain embodiments of this invention.

FIG. 2 is a sectional view through the sprinkler in side elevation, particularly illustrating the fluid flow valve and nozzle driving apparatus.

FIG. 3 is a top view of the sprinkler with parts broken away, particularly showing the torque arm for controlling the fluid flow valve.

FIG. 4 is a fragmentary sectional view taken on the line 4—4, FIG. 3, showing the relationship between the torque arm and the fluid flow valve control screws.

FIG. 5 is a fragmentary sectional view taken on the line 5—5, FIG. 2, showing details of the fluid flow valve construction.

Figure 7:
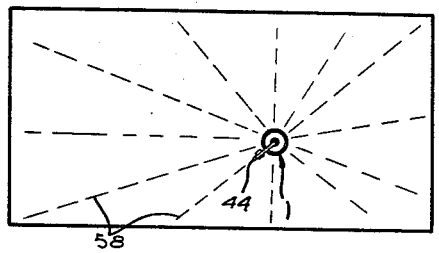
FIG. 7 is a plan view illustrating one area pattern suited for watering by the lawn sprinkler wherein the radial distances from the sprinkler to the outer edges of the area are different.
Figure 1:
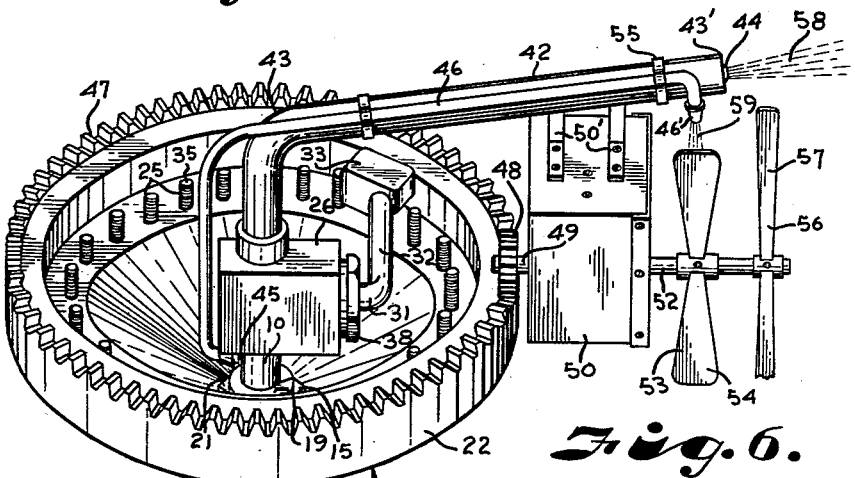
FIG. 1 is a perspective view of the lawn sprinkler embodying this invention positioned for insertion into a receiving socket.
Figure 6:
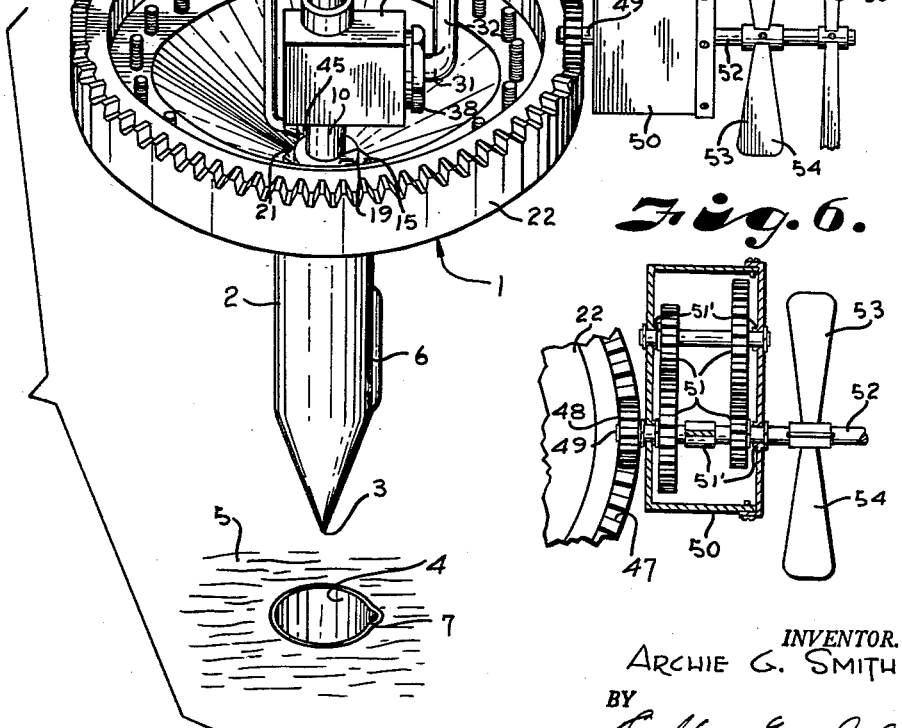
FIG. 6 is a fragmentary sectional view particularly illustrating the nozzle driving gear reducer and paddle wheel.

Referring to the drawings in more detail:

The reference numeral 1 generally indicates a lawn sprinkler embodying this invention. The lawn sprinkler 1 has a support standard 2 which may be of any suitable shape and, in the illustrated structure, the supporting standard 2 has an external shape tapering to a pointed lower end 3 which is adapted to be inserted in a socket 4 embedded into the surface of a lawn or garden 5. It is to be understood that the use of a socket 4 is optional since the pointed end 3 is adapted to be inserted directly into the soil, if desired.

The standard 2 includes an outwardly extending rib portion or key 6 adapted to be received in a mating portion 7 formed in the socket 4 whereby the standard 2 is prevented from rotating with respect to the lawn or garden 5.

The supporting standard 2 has a hollow interior portion 8 and a garden hose coupler 9 spaced from the pointed end so as to be above the socket 4, said coupler 9 communicating with the hollow interior portion 8 for introducing water thereinto under pressure with a suitable garden hose (not shown). A sleeve 10 having an upper end 11 and a lower end 12 extends vertically into and communicates with the upper part of the interior portion 8. The sleeve 10 is flared or otherwise provided with an annular flange 12' at the lower end thereof for engaging with a suitable lower seal such as an O-ring seal 13 supported against a circular groove 14 formed in the lower inner edge of an externally threaded sleeve bearing member 15. The sleeve 10 is rotatably supported in the bore 15' of the bearing member 15 for rotation about a vertically extending axis. An upper seal such as an O-ring seal 16 is contained in an internal circular groove 17 formed in the bearing member 15 and spaced from the seal 13. The seal 16 engages with the outer surface 18 of the sleeve 10. The bearing member seals 13 and 16 are preferably fluid-pressure actuated and permit the sleeve 10 to rotate with respect to the bearing member 15 while preventing water leakage therebetween. The standard 2 is internally threaded at the upper end 18' thereof for receiving and supporting the bearing member 15, the cooperating threads preventing leakage therebetween. A split ring 19 engages in an external circular groove 20 on the sleeve surface 18 and engages against the upper surface 21 of the bearing member 15 in order to maintain a desired compressive force between the flange 12' and the O-ring seal 13 and also to prevent downward axial motion of the sleeve 10 whereby structure (described hereinafter) can be supported on the upper end 11 of the sleeve 10.

A housing 22, in the illustrated example of substantially inverted conical configuration, has a threaded bore 23 extending axially therethrough and engaged with external threads 24 on the upper end 18' of the standard 2 whereby the housing 22 is supported thereon. A plurality of circumferentially spaced elongated vertically adjustable screws 25 extend upwardly through the housing 22 for a purpose described hereinafter.

A fluid flow valve 26 has an input port 27 and an output port 28 and a valve core 29 spaced therebetween. The core 29 has a passageway 30 extending therethrough and adapted to be selectively aligned with the ports 27 and 28 by rotation of the core 29 for controlling fluid flow through the valve 26.

The valve 26 is threadedly engaged with and supported on the upper end 11 of the sleeve 10 and is adapted to rotate therewith. The valve 26 communicates at the input port 27 with the sleeve 10. The valve core 29 has a laterally extending control member or rod 31 fixed thereto and adapted to control the rate of fluid flow through the valve in response to the rotary position of the rod 31 with respect to the valve. A torque arm 32 is secured at one end thereof to the control rod 31 and extends at an angle with respect thereto, preferably 90 degrees, FIG. 3. The torque arm 32, in the illustrated structure, terminates at the other end thereof in a weight 33 adapted to exert a downward force on the torque arm 32 resulting in a torque force on the control rod 31. It is noted that spring biasing may be substituted for the weight 33, if desired, without departing from the scope of this invention. The lower surface 34 of the weight 33 is adapted to be sequentially contacted by the upper ends 35 of the screws 25 for determining the vertical position of the weight 33 with respect to the housing 22. The circumferential spacing of the screws 25 is preferably slightly less than the length of the lower surface 34 whereby the weight 33 transfers smoothly thereacross. It will be apparent that the alteration in vertical height of the weight 33 results in a variation of the quantity of fluid permitted to pass through the valve 26 at any given pressure differential.

The core 29 is supported at one end thereof by means of a stud 36 formed integrally therewith and adapted to engage in a counterbore 37 formed at one end of the valve 26. The core 29 is supported at the other end thereof by means of a threaded plug 38 engaging in the valve 26 and having a bore 39 extending therethrough to provide a bearing surface for the control rod 31. A suitable packing or seal such as an O-ring 40 is positioned between the core 29 and the plug 38 and is adapted to prevent water leakage between the control rod 31 and the bore 39. A suitable annular seal 41 is positioned between the plug 38 and the valve 26 to prevent water leakage between the threaded connection formed therebetween. It is noted that the particular configuration between the plug 38, core 29 and O-ring 40 provides a substantially complete watertight seal around the control rod 31 while permitting ease of control rod rotation whereby a relatively small weight 33 is required to provide the necessary valve control.

An elongated tube 42 is threadedly secured at one end 42' thereof to the valve 26 and there communicates with the output port 28. The tube 42, in the illustrated example, curves or bends away from the vertical at 43 and terminates at the other end 43' thereof in a spray nozzle 44 pointed generally upwardly and laterally of the housing 22. The tube 42 is adapted to rotate with the valve 26 for radially dispensing water over an area surrounding the sprinkler 1.

A coupler or tap 45 communicates with the interior of the sleeve 10 at a position spaced below the valve 26. A tube or passage means 46 communicates at one end thereof with the tap 45 and at the other end thereof terminates in a nozzle 46'. It is to be understood that the tube 46 and nozzle 46' are adapted to permit a fluid flow therethrough of only a small fractional quantity compared to the quantity which is able to flow through the tube 42 and nozzle 44.

The housing 22 has a circular gear face 47, in the illustrated example, positioned on the upper peripheral surface thereof. A pinion 48 is adapted to engage with the circular gear face 47 and is secured to a shaft 49 forming the output of a speed reducer 50 preferably of a gear type. The speed reducer 50 is secured by means of suitable brackets 50' to the tube 42 whereby the pinion 48 is opperably engaged with the gear face 47 regardless of the rotational position taken by the tube 42 with respect to the housing 22. The speed reducer 50 contains suitable gearing 51 and shaft supports 51' whereby the pinion 48 turns at a much lower rotational speed than the input shaft 52 extending into the speed reducer. A paddle wheel 53 having suitable blades 54 is fixed to the input shaft 52. The nozzle 46' is directed toward the blades 54 at a suitable angle whereby water exiting from the nozzle 46' impinges against the blades 54 to cause the paddle wheel 53 to rotate, rotatably driving the input shaft 52. The nozzle 46' is maintained in fixed relation with respect to the paddle wheel 53 by means of brackets 55 securing the tube 46 against the tube 42.

In the illustrated example, a fan-like member 56 is secured to the input shaft 52 and has radially extending blades 57 adapted to periodically cross the path 58 of the fluid being expelled from the nozzle 44. The member 56 aids in providing an even distribution of water over the radial path of the fluid directed by the sprinkler 1.

In operation, a suitable fluid such as water is introduced under pressure into the standard 2 by means of a suitable garden hose (not shown) attached to the coupler 9. A small portion of the fluid entering the standard 2 is transmitted through the tube 46 and out the nozzle 46' into a path 59 directed toward the paddle wheel 53 causing the input shaft 52 to rotate. The rotation of the input shaft 52 results in a rotation of the pinion 48 engaged with the gear face 47 whereby the gear reducer 50 moves in a circumferential path about the housing 22 and causes the supporting tube 42, tube 46 and valve 26 to rotate therewith. As the valve 26 rotates, the weight 33 contacts the upper ends 35 of the spaced screws 25 causing said weight to move substantially vertically with respect to the housing 22. The vertical movement of the weight 33 induces a corresponding rotation of the core 29 with respect to the valve 26 which causes a variation in flow through the valve 26 and therefore past the nozzle 44.

It will be appreciated that the proper adjustment of the screw upper ends 35 with respect to the housing 22 produces a corersponding variation in fluid velocity at the nozzle 44 which determines the radial distance the fluid will travel from the sprinkler 1. If desired, the sprinkler 1 may be adjusted so as to produce a fluid dispensing pattern which is substantially rectangular in shape, as illustrated in FIG. 7. However, it is to be appreciated that other area patterns such as kidney-shapes, ellipses, circular areas or complex configurations including corners may be produced at will. The latter is particularly desirable for lawns or gardens terminating adjacent to a sidewalk or the like where pedestrian traffic is expected.

It is also to be noted that the rotational speed of the nozzle 44 is substantially independent of the distance over which the nozzle 44 is spraying so long as the input water pressure is high with respect to the water pressure downstream from the valve 26. This feature permits a more accurate prediction of the quantity of water dispensed from the lawn sprinkler 1 by reference to the number of nozzle cycles, for example, by a suitable counting mechanism (not shown).

It is to be understood that while I have illustrated and described one form of my invention, it is not to be limited to the specific form or arrangement of parts herein described and shown except insofar as such limitations are included in the claim.

What I claim and desire to secure by Letters Patent is:

A lawn sprinkler comprising, a housing, a fluid flow valve having an input port and an output port, means rotatably supporting said valve with respect to said housing, said valve communicating at said input port with a high pressure fluid transmitting means and having a laterally extending control rod pivotally mounted at one end thereof on said valve, said control rod being adapted to control the flow rate through said valve in response to the vertical pivotal position thereof with respect to said valve, a weight on the other end of said control rod and adapted to apply a torque to said control rod for operating said valve, said weight having a lower circumferentially elongated cam-follower surface, a plurality of circumferentially spaced elongated screws adjustably, threadedly engaged in said housing and being spaced apart a distance less than the length of said cam-follower surface, said screws being adapted to sequentially contact said weight for sequentially altering the pivotal position of said control rod with respect to said valve, said valve being fixed to and communicating at said output port with one end of an elongated tube, said tube terminating at the other end thereof in a spray nozzle adapted to rotate with said valve for radially dispensing fluid over an area surrounding said sprinkler, said housing including a circular gear base on the periphery thereof, a pinion engaged with said gear face, said pinion being operatively connected to the output of a gear reducer, said gear reducer being fixed to said tube and adapted to rotate therewith, an input shaft on said gear reducer, a paddle wheel secured to said input shaft, and tube and nozzle means fixed to said first named tube and communicating with said high pressure fluid transmitting means and adapted to direct a stream against said paddle wheel to induce the rotation thereof whereby said valve is continuously rotated with respect to said housing and said sprinkler is responsive to the adjusted position of said screws to spray fluid in a predetermined pattern.

References Cited in the file of this patent

UNITED STATES PATENTS

| | | |
|---|---|---|
| 2,475,537 | Ashworth | July 5, 1949 |
| 2,601,559 | Riblet | June 24, 1952 |
| 2,805,098 | Hurley | Sept. 3, 1957 |
| 2,808,506 | Skwarek | Oct. 1, 1957 |
| 2,962,220 | Woods | Nov. 29, 1960 |
| 2,990,120 | Reynolds | June 27, 1961 |
| 2,999,643 | Kennedy | Sept. 12, 1961 |